Feb. 24, 1970  B. L. COUBERLY  3,497,095
COUNTERBALANCE APPARATUS FOR A LIFT TRUCK
Filed Jan. 12, 1966  3 Sheets-Sheet 2

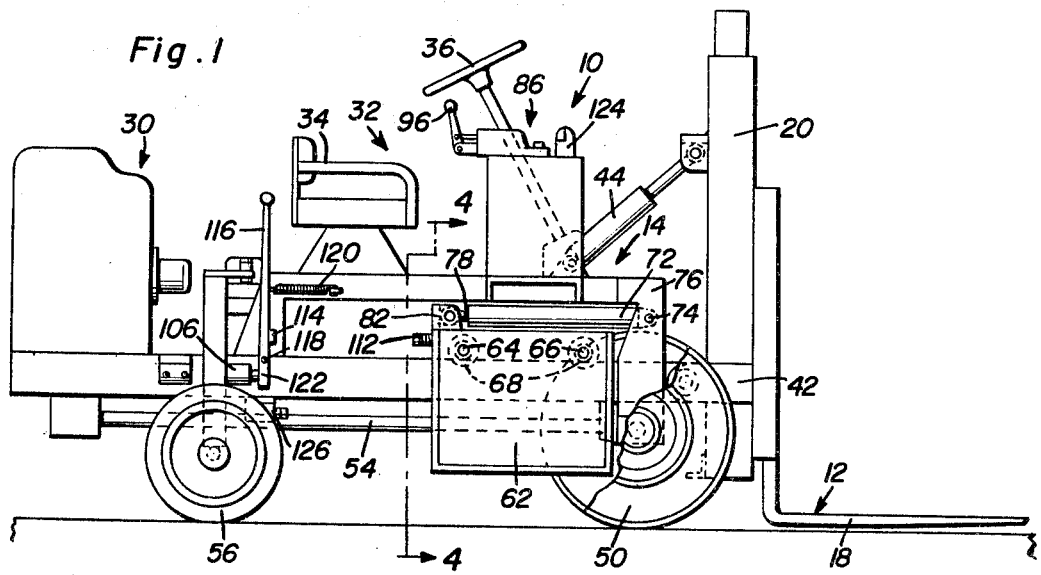

Benjamin L. Couberly
INVENTOR.
BY

Benjamin L. Couberly
INVENTOR.

BY Clarence A. O'Brien
and Harvey B. Jacobson
Attorneys

# United States Patent Office 3,497,095
Patented Feb. 24, 1970

3,497,095
COUNTERBALANCE APPARATUS FOR
A LIFT TRUCK
Benjamin L. Couberly, 1601 Evans St.,
Gridley, Calif. 95948
Filed Jan. 12, 1966, Ser. No. 520,226
Int. Cl. B66f 9/22, 9/08
U.S. Cl. 214—674                                    8 Claims

ABSTRACT OF THE DISCLOSURE

A lift truck incorporating ballast means longitudinally shiftable on the frame between the front traction wheels and the rear steering wheels, the shifting of the weight enabling an increased traction on the front drive wheels when the lift truck fork is unloaded, as well as an effective counterweight means for the loaded truck.

---

This invention relates generally to lift trucks and more particularly to fork-lift trucks including means thereon for counterbalancing lifted loads as well as means for increasing the traction of the truck drive wheels.

Briefly, this invention comprises a conventional fork-lift truck having either a T-frame or other well-known frame configuration, including shiftably controlled ballast or counterweight means slidably mounted between the front or drive wheels and back or steering wheels. While prior art inventions have been devised for solving the problem of increased load-lifting capabilities for lift trucks by providing counterbalancing weights to offset the lifted load, these prior art devices conventionally mount the weights or ballast over the rear steering wheels of the truck or rearwardly of the rear wheels of the truck in order to provide the most efficient leverage for counterbalancing the load lifted by the front mounted fork. These prior art devices have proved to be moderately successful for the intended counterbalancing purpose, but do not have the capability of traversing over rough ground without a load on the front fork as the rear-mounted weights not only do not provide added traction for the front driving wheels, but actually decrease the traction thereon, as well as making steering of the rear steering wheels difficult. These prior art machines simply employ features such as over-sized tires, wheel weights, increased power or the like to provide added traction for the front driving wheels.

Accordingly, it is an object of the present invention to provide means for overcoming the major problems encountered in off-pavement use of fork-lift trucks.

It is another object of the present invention to provide a ballast or counterweight means for use on a lift truck in order to achieve both traction on the driving wheels thereof as well as to provide means for counterbalancing loads carried thereby.

It is a further object of the present invention to provide slidable ballast means for fork-lift trucks which obviates the necessity of alternative means for achieving added traction on the driving wheels.

It is a still further object of the present invention to provide adjustable ballast means which may be readily added to existing lift trucks or built into new trucks at low cost, the ballast means obviating the necessity for increased weight or power to achieve added traction for the front driving wheels.

It is another object of the present invention to provide novel ballast means for fork-lift trucks which results in increased maneuverability and control thereof over rough terrain as well as decreased cost, weight, and power requirements therefor.

It is a further object of the present invention to provide fork-lift trucks with increased flexibility of use, as for example by providing trucks with means allowing ease of traversal over rough terrain.

It is another object of the present invention to provide fork-lift trucks having shiftable counterweights thereon including safety means providing for lifting of the fork-lift only when the counterbalance weights are in their rearmost position, and a manual over-ride for the safety means.

It is a further object of this invention to provide fork-lift trucks of the character described which can be towed from the rear end thereof as a two-wheeled vehicle upon the removal of excessive weight from the rear end thereof.

In accordance with the immediately foregoing object, it is another object of this invention to provide automatic jacking means for use on a fork-lift truck.

It is a further object of this invention to provide automatically operated means for shifting the movable ballast of a fork-lift truck in response to excessive loading on the lifting forks of the truck.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of a fork-lift truck employing the novel ballast means of the present invention;

FIGURE 2 is a top plan view of the fork-lift truck illustrated in FIGURE 1;

FIGURE 11 is a partial front elevational view corresponding to FIGURE 7; and

Figure 4:
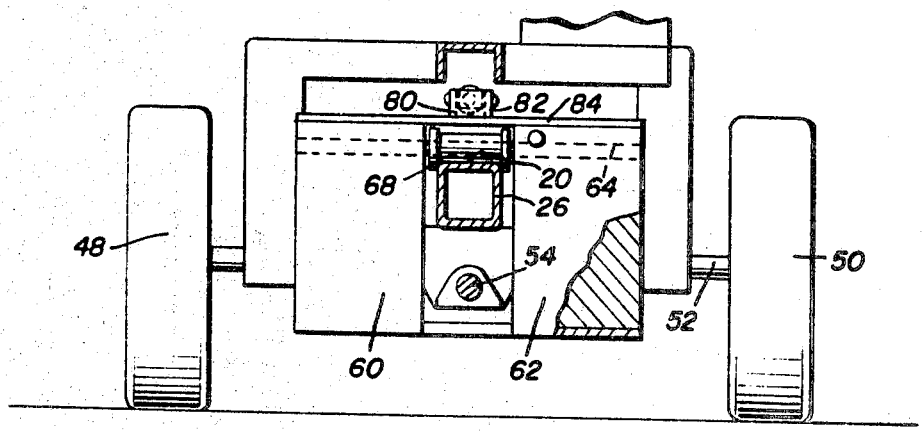
FIGURE 4 is an enlarged view partially in vertical cross section and partially in vertical elevation taken substantially on the plane of the line 4—4 of FIGURE 1.

Referring now to the drawings in greater detail, reference numeral 10 generally denotes a conventional fork-lift truck, the truck 10 including the lift fork 12, conventionally mounted on the front portion of the truck body 14. The lift fork 12 conventionally includes a pair of lift arms 16 and 18, the arms 16 and 18 being mounted on a lift mast 20 for vertical movement under control of a fork cylinder 22. The truck 10 further includes a generally T-shaped frame 24 including longitudinal frame member 26 and cross frame member 28, both of the frame members being of box-like steel tubing as best illustrated in FIGURE 4. Supported on the frame 24 at the rear end of longitudinal member 26 is the vehicle engine and clutch transmission compartment 30, the operator's section 32 including seat 34 and steering wheel 36, and the lift mast mounting structure 38. The lift mast mounting structure 38 includes pivotal arms 40 and 42 to which the mast 20 is attached, the arms being rotatably mounted by pin 43 on frame 26, and hydraulic cylinders 44 and 46 for controlling the lateral tilting and side shifting movement of the fork.

The truck 10 conventionally includes a pair of front mounted drive wheels 48 and 50, mounted on an axle contained within axle housing 52, and driven by drive shaft 54 extending from the engine compartment 30. Further, the truck 10 conventionally includes a pair of rear mounted steerable wheels 54 and 56 controllable from the steering wheel 36 through the steering linkage generally denoted by reference numeral 58. Thus, it will be appreciated from the foregoing description, that the truck 10 comprises a generally conventional fork-lift truck including the front mounted fork which is tiltable and laterally shiftable, including vertical lift fork arms, a rear mounted engine, a T-shaped frame, front mounted power driven wheels and rear mounted steerable wheels.

Figure 3:
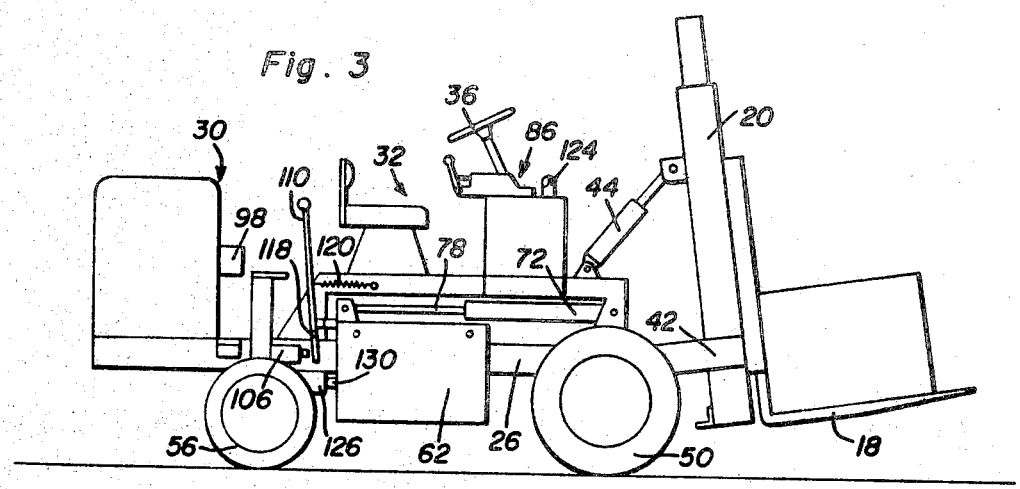
FIGURE 3 is a side elevational view of the fork-lift truck of FIGURE 1 on a reduced scale, with the fork-lift in load bearing position.

Mounted on the longitudinal frame member 26 and movable therealong are a pair of ballast-type counterweights 60 and 62, which are preferably constructed of a relatively heavy metallic material such as iron or steel or the like. The counterweights 60 and 62 are saddle mounted on the sides of the longitudinal frame member 26 by a pair of bearing shafts 64 and 66 which extend through both counterweights 60 and 62, the shafts 64 and 66 each having a spool-type roller 68 rotatably mounted thereon. The rollers 68 are rollingly supported on the upper surface 70 of longitudinal frame member 26, thus allowing the counterweights 60 and 62 to be longitudinally shiftable from a position partially between the front wheels 48 and 50, as illustrated in FIGURES 1 and 2 to a position just in front of the back wheels 54 and 56, as illustrated in FIGURE 3.

A hydraulic cylinder 72 is rotatably mounted at end 74 on the upstanding frame member 76, the ram 78 thereof being fixed between a pair of upstanding ears 80 and 82, which ears are in turn fixed to the crossbar 84 which is fixedly mounted across the tops of both counterweights 60 and 62. Thus, it will be apparent that the counterweights 60 and 62 may be moved longitudinally along the longitudinal frame member 26 on rollers 68 by activation of the hydraulic cylinder 72.

Mounted in the driver's compartment for easy access is a hydraulic cylinder control section generally denoted by reference numeral 86. The hydraulic control section includes the hydraulic control actuator switches 88, 90, 92 and 94, each of which has a similar handle 96 for actuation thereof. These actuator switches respectively control the above mentioned cylinders 22, 72, 44 and 46. A conventional hydraulic pump 98 for pumping hydraulic fluid to the various hydraulic cylinders included on the truck 10 is mounted on the engine compartment 30, and connected by hydraulic flow line 100 to a hydraulic flow divider valve 102. The flow divider valve 102 is in turn connected by hydraulic flow line 104 to the hydraulic selector valve 106, and by hydraulic flow line 108 to the hydraulic control actuator switches 90, 92 and 94. The selector switch 106 is connected by hydraulic flow line 110 to the hydraulic control actuator switch 88. Thus, the aforementioned switches, valves and flow lines constitute the hydraulic control system for operation of the various hydraulic cylinders on the truck 10.

The movable counterweight 62 is preferably positioned as shown in FIGURES 1 and 2 partially between the front or driving wheels 48 and 50 when the truck 10 is unloaded, in order to provide increased traction on the front driving wheels, thus allowing the truck 10 to traverse over rough or uneven ground. Thus, the truck 10 will be useful for off-pavement purposes, as for example if the user thereof has to drive over uneven or soft ground into a field to pick up loaded containers or the like. However, once the truck is loaded, as for example as illustrated in FIGURE 3, the counterweights 60 and 62 are preferably moved to the positions shown in FIGURE 3 in order to provide a counterweight for the load, the load itself providing the necessary traction on the front driving wheels 48 and 50. Of course, it will be appreciated that the handle 96 on actuator switch 90 may be used to actuate the hydraulic cylinder 72 in order to move the counterweights 60 and 62 rearwardly on rollers 68 to the position shown in FIGURE 3.

Figure 5:
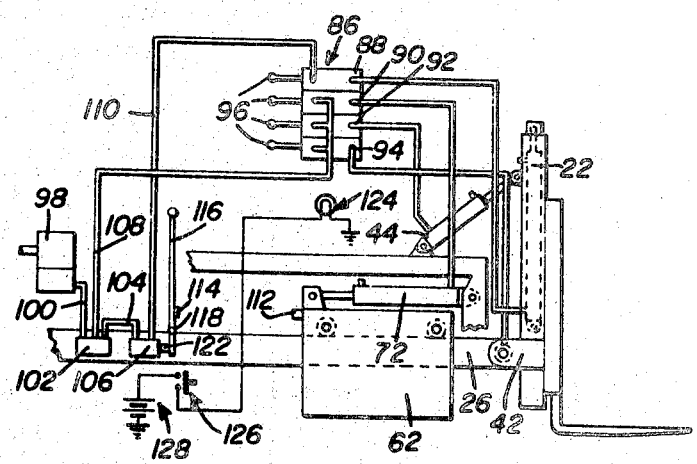
FIGURE 5 is a schematic view of the hydraulic control and electrical circuitry utilized in conjunction with the present invention.

The selector valve 106 is provided as a safety means in order to prevent the lifting cylinder 22 from being actuated while the counterweights 60 and 62 are in a forward or traction-providing position rather than the rearward or counterbalancing position. In order to actuate the hydraulic cylinder 22, it is necessary that the counterweights 60 and 62 are moved to the position illustrated in FIGURE 3, thereby actuating the selector valve 106 as the projecting member 112 on counterweight 62 abuts the projecting member 114 on selector valve control lever 116 and pivots the lever 116 about pivot point 118 against the force of coil spring 120. At this time, the longitudinally movable switch member 122 of selector valve 106 will be released and valve 106 will allow hydraulic fluid to flow over line 110 to the actuator switch 88. Thus, it will be observed from viewing FIGURES 1 and 5 in particular, that the selector valve control lever 116 is normally retained in upright position through the force of spring 120, and, as the lever 116 is pivoted at 118 the bottom portion thereof will cause the switch 122 of selector valve 106 to be moved inwardly thus closing the valve 106. However, as explained above, when the counterweights 60 and 62 are moved to their rearward positions, the control lever 116 is forced to the position illustrated in FIGURE 3, thereby opening the valve 106 and allowing hydraulic fluid to flow to actuator switch 88. At this time, the actuator switch 88 may be activated in order to operate the hydraulic cylinder 22. However, if it is desired to actuate the hydraulic cylinder 22 without moving the counterweights 60 and 62 to the position illustrated in FIGURE 3, the operator of the truck may simply move the control lever 116 rearwardly with one hand while operating the actuator switch 88 with the other hand. This would provide an over-ride arrangement whereby the lift fork may be actuated while the counterweight remains forward or in the no-load position, or in an intermediate position, as for example when the load being lifted is rather light and the added traction achieved by use of counterweights 60 and 62 in the forward position is needed.

An indicator light 124 is mounted in the driver compartment of truck 10 and connected through normally open switch 126 to the vehicle battery 128. The light is provided in order to indicate when the counterweights 60 and 62 have been moved to their rearward positions, thereby acting as an additional safety device for the truck. The switch 126 includes a sliding actuator member 130, the switch 126 being mounted so that the counterweight 62 will contact the actuator member 130 in its rearmost position, as illustrated in FIGURE 3, thus closing the normally open switch 126 and lighting the light 124.

It will be appreciated, of course, that the hydraulic control system may also be in a series arrangement, that is, the selector valve 106 could be placed in the flow line 108 and thus the flow divider valve 102 would not be needed.

Figure 6:
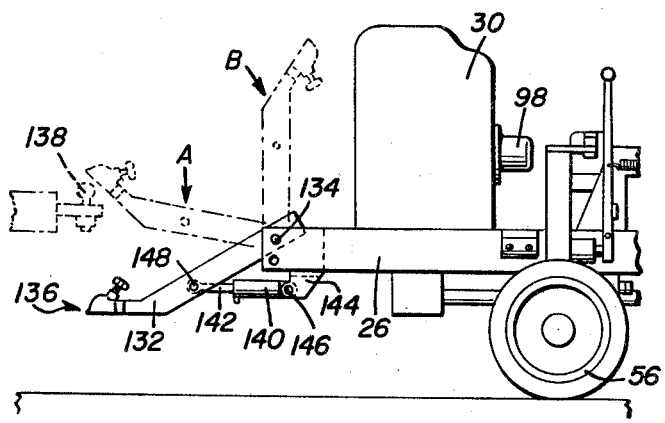
FIGURE 6 is a partial side elevational view similar to that of FIGURE 1, illustrating a first modified form of the present invention.
Figure 8:
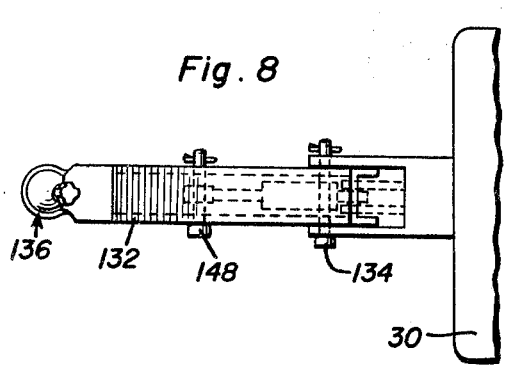
FIGURE 8 is a partial enlarged top plan view corresponding to the view of FIGURE 6.
Figure 9:
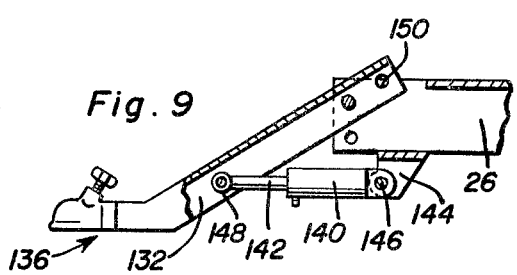
FIGURE 9 is an enlarged view in partial side elevation and in partial vertical section corresponding to the view of FIGURE 6.
Figure 12:
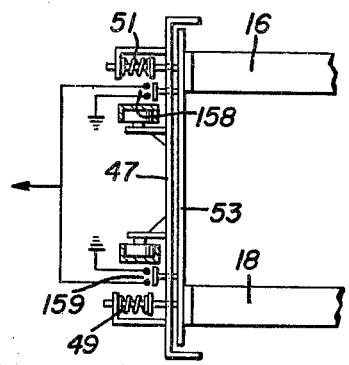
FIGURE 12 is a top plan view corresponding to FIGURE 10.

Referring now to FIGURES 6, 8 and 9 in particular, it will become readily apparent that the truck 10 will be towable as a two-wheeled vehicle. Thus, it will be seen that longitudinal frame member 26 extends rearwardly past the engine and clutch transmission compartment 30, and has a tow bar 132 hinge pinned thereto by pin 134.

The tow bar 132 has a conventional hitch socket 136 at the end thereof, and hence the bar can be conventionally attached to the mounting ball 138 of a towing vehicle, see FIGURE 6, for example.

The rear end of the truck 10 may be lifted into towing position by a hydraulic cylinder 140, including the piston 142. The cylinder 140 is hingedly connected to a depending leg 144 which extends downwardly from frame member 26 by pin 146, and the piston 142 is hingedly connected to the bar 132 by pin 148. Thus by referring to FIGURES 6 and 9 in particular, it will be observed that the bar 132 may first be moved by cylinder 140 to the position indicated as A and the bar moved downwardly onto ball 138. As bar 132 is so moved by cylinder 140, the rear steering wheels 54 and 56, and of course the rear end of truck 10 will be raised into towing position on the front wheels 48 and 50. A locking pin 150 may then be inserted through the frame 26 and bar 132 in order to maintain this upwardly suspended towing position of the truck. Of course, the truck is lowered by reversing the above-described procedure. Further, the tow bar 132 may be moved to carrying position B by removing the pin 148 and folding bar 132 upwardly about pin connection 134. The cylinder 140 may be supported by chain from frame 26 at this time, or otherwise supported.

Figure 10:
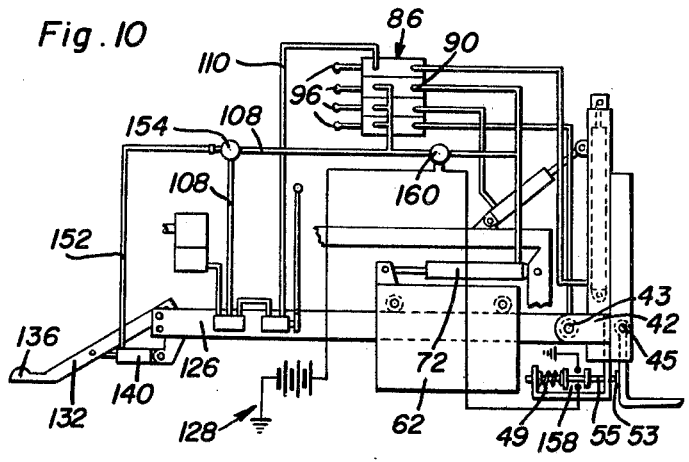
FIGURE 10 is a schematic view of the hydraulic control and electrical circuitry utilized in conjunction with the forms of the invention illustrated in FIGURES 6–9.

Referring to FIGURE 10, it will be observed that the cylinder 140 is connected by hydraulic fluid flow line 152 to a suitable quick coupling connection 154 to the flow line 108, or directly to any desired actuator switch 88, 90, 92 or 94 for actuation thereof. Of course, it will be appreciated that, when the tow bar 132 is used to lift the rear end of truck 10, that the counterweights 60 and 62 will have been moved to their forwardmost position so that the minimum amount of weight will be over the rear wheels.

Figure 7:
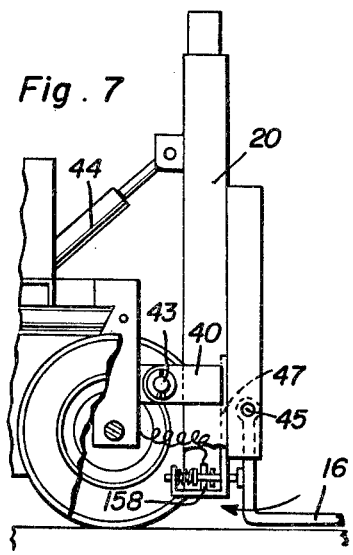
FIGURE 7 is a partial side elevational view similar to that of FIGURE 1, illustrating a second modified form of the present invention.

Referring now to FIGURES 7 and 10 apparatus for automatically shifting the counterweights rearwardly when the fork 12 is overloaded will be described. The fork tines 16 and 18 are rotatably mounted on pin 45 to the center lift section 47 and are supported by springs 49 and 51 and compression bar 53 near the bottom of their vertical section. When the fork tines 16 and 18 are overloaded the springs 49 and 51 will be compressed allowing the compression bar 53 and plunger 55 to close the normally open micro-switches 158 or 159. Referring to FIGURE 10, it will be seen that micro-switches 158 and 159 are electrically connected to electric hydraulic switch 160, which hydraulic switch 160 provides an override or by-pass of manual ballast shift control switch 90 and thus causing ballast cylinder 72 to move the ballast toward the rear of the truck automatically. When the overload is removed, the circuit will open and the manual control switch 90 can be employed to move the ballast as desired.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be restored to, falling within the scope of the invention.

What is claimed as new is as follows:

1. A lift truck comprising a frame having a fork mast at its forward end, a load fork mounted on and extending forwardly from said mast and movable vertically of said mast, front and rear axle means supporting said frame, a longitudinally extending frame member extending between said front and rear axle means, weight means, means for supporting said weight means on said frame member for movement solely between the front and rear axle means, means for shifting said weight means solely between and inward of said front and rear axle means between a traction position adjacent said front axle means and a counterweight position adjacent said rear axle means, and means for indicating when said weight means is in said counterweight position.

2. The combination of claim 1 wherein said truck includes a hydraulic cylinder for operating said load fork, said shifting means comprising a hydraulic cylinder connected between said frame and said weight means, a hydraulic control system, said system normally preventing operation of said load fork hydraulic cylinder, and safety means in said hydraulic control system for allowing operation of said load fork hydraulic cylinder, said safety means being operable independently of said load fork cylinder and selectively openable both in response to a positioning of said weight means in said counterweight position adjacent said rear axle means and by a manual manipulation thereof.

3. The combination of claim 2 wherein said safety means comprises a hydraulic selector switch in said hydraulic control system, said hydraulic selector switch controlling the flow of hydraulic fluid to said load fork hydraulic cylinder, means for automatically closing said hydraulic selector switch when said weight means is out of said counterweight position and preventing flow of fluid to said load fork hydraulic cylinder, and means for automatically opening said hydraulic switch when said weight means is moved to said counterweight position for allowing flow of fluid to said load fork hydraulic cylinder.

4. The combination of claim 3 wherein said weight means comprises a pair of weight blocks, roller means rollingly mounted on said frame member, a bearing shaft, said roller means journaled on the bearing shaft, said bearing shaft extending transversely outwardly of said roller means and said frame member, and said weight blocks mounted on said bearing shaft on opposite sides of said frame member.

5. A lift truck having a frame with a fork mast at the forward end thereof, load fork means vertically shiftable on said mast, ballast means longitudinally slidable on said frame, load fork control means for controlling the movement of said load fork means, means for controlling the movement of said ballast means, and enabling means responsive to a predetermined position of said ballast means for enabling the activation of said load fork control means, said load fork control means and said ballast control means comprising hydraulic cylinders, said enabling means comprising, hydraulic fluid pump means, fluid valve means fluidly coupled to said pump means for dividing the hydraulic fluid flow to two outlet channels, a selector valve, one of said outlet channels coupled to the selector valve, and means on said ballast means for enabling a selective and complete opening and closing of said selector valve in order to activate said load fork hydraulic cylinder.

6. The combination of claim 5 wherein said truck includes a longitudinally extending frame member, roller means rollingly mounted on said frame member, a bearing shaft, said roller means journaled on the bearing shaft, said bearing shaft extending transversely outwardly of said roller means and said frame member to the opposite sides thereof, said ballast means mounted on the outwardly extending portions of said bearing shaft adjacent said frame member, said ballast means comprising a pair of weight blocks, said weight blocks being mounted on said bearing shaft on opposite side of said frame member, and means for joining said weight blocks whereby said ballast means is saddle-mounted on said frame member by said roller means.

7. The combination of claim 5 wherein said lift fork means is mounted for rotation relative to the mast about a horizontal axis, automatic means on said frame responsive to a predetermined rotated position of said load fork means for overriding said controlling means and automatically moving of said ballast means rearwardly on said frame.

8. The combination of claim 7 wherein said automatic means comprises electric switch means on said frame, said switch means being normally open and closed upon contact by said lift fork means as it rotates to said predetermined position.

References Cited

UNITED STATES PATENTS

| | | | |
|---|---|---|---|
| 733,128 | 7/1903 | Bennett et al. | 212—48 |
| 1,821,816 | 9/1931 | Quaas. | |
| 2,823,813 | 2/1958 | Shimmon | 214—75 |
| 1,775,297 | 9/1930 | Towner | 280—490 |
| 2,759,563 | 8/1956 | Marnon et al. | 214—672 X |
| 2,763,385 | 9/1956 | Harrison | 214—142 |
| 2,771,306 | 11/1956 | Ash | 280—468 X |
| 2,833,562 | 5/1958 | Francois | 280—405 X |
| 2,916,172 | 12/1959 | Locke | 214—674 |
| 3,240,353 | 3/1966 | Leavesely | 212—49 |
| 219,691 | 9/1879 | Coudoint-Gougeul | 212—49 |
| 2,711,227 | 6/1955 | Shimmon | 212—49 |

FOREIGN PATENTS

| | | |
|---|---|---|
| 209,435 | 2/1956 | Australia. |
| 1,066,492 | 1/1954 | France. |
| 1,285,451 | 1/1962 | France. |
| 188,040 | 3/1964 | Sweden. |

GERALD M. FORLENZA, Primary Examiner

R. B. JOHNSON, Assistant Examiner

U.S. Cl. X.R.

214—142